Dec. 4, 1956  R. A. COVINGTON, JR., ET AL  2,772,548
COUPLING
Filed April 7, 1955
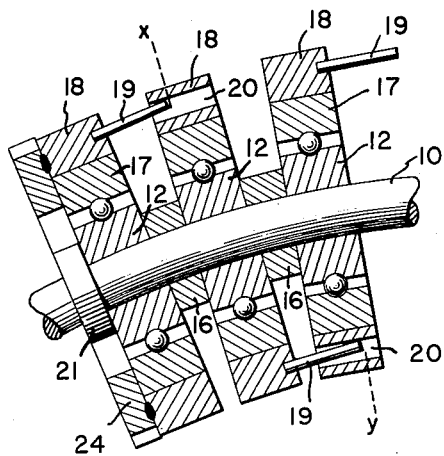
INVENTORS
ROBERT A. COVINGTON, JR.
VINCENT H. WALDIN
BY Harry J. McCauley
ATTORNEY

United States Patent Office 2,772,548
Patented Dec. 4, 1956

2,772,548

COUPLING

Robert A. Covington, Jr. and Vincent H. Waldin, Wilmington, Del., assignors to E. I. du Pont de Nemours and Company, Wilmington, Del., a corporation of Delaware Application April 7, 1955, Serial No. 499,775

2 Claims. (Cl. 64—2)

This invention relates to a power-transmitting coupling, and particularly to a power-transmitting coupling which is adapted to transmit power between pairs of shafts disposed at any angle one with respect to the other and which can also be used to transmit power to a resilient sleeve disposed in concentric relationship with respect to the coupling.

A great variety of couplings exist for transmitting power between offset shafts but specific designs appear to have been devised to meet specific requirements imposed by the orientation of the driving shaft of a pair with respect to the driven shaft. Consequently, no one coupling design is widely applicable to different types of nonaligned shaft pairs.

An object of this invention is to provide a coupling which is adapted to use in situations where the shafts of a pair may be out of alignment in a great variety of different ways. Another object of this invention is to provide a coupling which is adapted to serve as a transmission for the drive of a resilient sleeve disposed concentric with the coupling elements. Yet another object of this invention is to provide a coupling for the transmission of power along a curved, or compoundly curved, course. The manner in which these and other objects of this invention are attained will become apparent from the detailed description and the single drawing, which is a side elevation view of one embodiment of coupling constructed according to this invention wherein the individual bearings, their surrounding sleeves and the bearing spacers are shown in cross section, while an end retaining collar and the supporting shaft are shown in full.

Generally, the objects of this invention are obtained by providing a coupling comprising a stationary shaft having a multiplicity of bearing elements mounted in concentric relationship therewith with the inner races of the bearings tight on the shaft and with the outer races provided with cooperating power-transmitting means disposed along adjacent faces.

Referring to the drawing, the coupling comprises a stationary supporting shaft 10 on which are mounted a multiplicity of anti-friction bearing assemblies, the inner races 12 of which are fixedly secured to shaft 10, as by frictional fitting, keying or the like, so as to be substantially non-rotatable when load is applied to the coupling.

In the particular application illustrated in the drawing, shaft 10 is curved along its axis, and it will be especially understood that this curvature may be simple, in the sense that it is in a single plane, or compound, in which case the shaft may have a spiral, helical or other course outside the limits of any single plane. Successive bearing assemblies are separated one from another by spacers 16 which preferably fit shaft 10 in tight frictional engagement and opposite faces of which are tapered so that the radial axes of bearing assemblies between spacer pairs lie substantially normal to the axis of the shaft.

The outer races 17 of the bearing assemblies constitute the power-transmitting elements of the invention but, since the outer races of standard bearing assemblies are of limited width radially, it is desirable to extend the outer races by providing them with metal sleeves 18 which are fixedly attached thereto, as by welding, brazing or shrink-fitting as convenient, the metal sleeves then being to all intents and purposes integral with the outer races 17.

Sleeves 18 are provided with cooperating power-transmitting elements such as pins 19 fixedly secured thereto which engage at all times with companionate receses 20 in the sleeves of adjacent bearing assemblies. A preferred construction is to make these recesses in the form of cylindrically drilled passages which, when the pins are in the position where adjacent bearing assemblies have the widest separation, the pins will be withdrawn from the passages 20 to the maximum degree so that the ends of the pins reach the point indicated at $x$, while 180° therefrom they will be advanced into the associated passages to the fullest extent so that the pins attain the position indicated at $y$. Thus, pins 19 are axially movable with respect to their mating recesses 20 to a degree accommodating for relative displacements of the outer bearing races 17 and sleeves 18 with respect to one another in the course of their rotation around shaft 10.

In the embodiment herein described in detail, the train of bearing assemblies is retained in position at one end by collar 21 fixedly secured to shaft 10, it being understood that a similar collar or its equivalent is provided at the other end of the train, not shown. Power is introduced to, or in the alternative removed from, the coupling by provision of an annular gear 24 which is welded or otherwise fixedly attached to the exposed face of the end sleeve 18 of the train. If desired, the end sleeve may be crowned or grooved to afford an engaging face for a belt drive or, if use permits, the outer periphery of the end sleeve 18 may be machined with teeth, thereby eliminating gear 24 altogether. It will also be apparent that, while pins and drilled passages have been described as preferred power-transmitting elements, adjacent faces of the outer races 17, or the sleeves 18 integral therewith, can be provided instead with engaging gear teeth or the like incorporating in the construction sufficient allowance axially for accommodation of races 17 at maximum and minimum separations during revolution.

The coupling of this invention is adapted to the transmission of power from one shaft to another where the angular dispositions vary widely, the couplings providing positive transmission with good dynamic balance, quiet operation and economy, in that relatively cheap standard bearing assemblies can be utilized successfully in the construction. An equally important use of the invention is its employment together with encircling resilient sleeves which it may be desired to rotate about complicated curved axes, such as disclosed in our copending application S. N. 499,825, it being understood that the sleeve to be driven is frictionally fitted, or otherwise securely attached, over the outside peripheries of the sleeves 18 in the latter application, so that the resilient sleeve turns with the outer races 17 and intermediate sleeves 18 and accommodates for the change in length at the outside of its course and at the inside by virtue of inherent resilience.

From the foregoing, it will be understood that the invention hereinabove described may be modified in numerous ways without departure from its essential spirit, for which reason it is desired to be limited only within the scope of the following claims.

What is claimed is:

1. A coupling comprising in combination a stationary shaft, a multiplicity of anti-friction bearings mounted concentric with said shaft with the inner races of said bearings sufficiently tight to said shaft to remain substantially immovable with respect to said shaft under load applied to the coupling, spacer elements disposed between adjacent bearings, and individual sleeves fixedly attached to the outside peripheries of the outer races of said bearings, said sleeves being provided with cooperating power-transmitting means along adjacent faces.

2. A coupling according to claim 1 wherein said cooperating power-transmitting means consists of pins fixedly attached at one end to one sleeve of an adjacent pair of said sleeves and movably engaged at the other end within companion recesses in the other sleeve of an adjacent pair of said sleeves.

References Cited in the file of this patent

UNITED STATES PATENTS

| | | |
|---|---|---|
| 934,821 | Lewis | Sept. 21, 1909 |
| 2,603,073 | Nield | July 15, 1952 |

FOREIGN PATENTS

| | | |
|---|---|---|
| 7,632 | Great Britain | May 16, 1890 |